United States Patent
Kumar et al.

(10) Patent No.: US 11,429,979 B2
(45) Date of Patent: Aug. 30, 2022

(54) METHODS, SYSTEMS AND COMPUTER PROGRAM PRODUCTS FOR TRANSACTION AUTHENTICATION

(71) Applicant: Mastercard International Incorporated, Purchase, NY (US)

(72) Inventors: Shubham Kumar, Haryana (IN); Vikas Bishnoi, Rajasthan (IN); Meenakshi Shandilya, Uttar Pradesh (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 298 days.

(21) Appl. No.: 16/522,027

(22) Filed: Jul. 25, 2019

(65) Prior Publication Data
US 2020/0097969 A1 Mar. 26, 2020

(51) Int. Cl.
| G06Q 20/40 | (2012.01) |
| G06Q 20/36 | (2012.01) |
| G06Q 20/32 | (2012.01) |
| G06Q 20/20 | (2012.01) |

(52) U.S. Cl.
CPC ........... *G06Q 20/409* (2013.01); *G06Q 20/20* (2013.01); *G06Q 20/325* (2013.01); *G06Q 20/3674* (2013.01)

(58) Field of Classification Search
None
See application file for complete search history.

(56) References Cited

U.S. PATENT DOCUMENTS

| 9,947,002 | B2 * | 4/2018 | Toomer | G06Q 20/32 |
| 2016/0012412 | A1 * | 1/2016 | Scanlon | G06Q 20/3224 |
| | | | | 705/44 |
| 2017/0048323 | A1 * | 2/2017 | Schlapfer | G16H 40/20 |
| 2017/0323292 | A1 * | 11/2017 | Agarwal | G06Q 20/20 |
| 2018/0101837 | A1 * | 4/2018 | Pandey | G06Q 20/322 |
| 2018/0253705 | A1 * | 9/2018 | Spector | G06Q 30/0207 |

* cited by examiner

*Primary Examiner* — Neha Patel
*Assistant Examiner* — Nicholas K Phan
(74) *Attorney, Agent, or Firm* — Buckley, Maschoff & Talwalkar LLC

(57) ABSTRACT

The invention relates to methods and systems for reducing user interventions necessary for authentication of electronic payment transactions. In an embodiment the invention comprises (i) receiving from a POS terminal a payment transaction request, and information identifying a first payment card for implementing the payment transaction request, (ii) receiving from a wireless access point, information corresponding to a set of payment cards enrolled with a mobile payment wallet implemented on said mobile communication device, (iii) determining whether received information corresponding to the first payment card matches received information corresponding to any payment card within the set of payment cards enrolled with the mobile payment wallet, and (iv) implementing the requested payment transaction based on the first payment card.

15 Claims, 12 Drawing Sheets

METHODS, SYSTEMS AND COMPUTER PROGRAM PRODUCTS FOR TRANSACTION AUTHENTICATION

CROSS-REFERENCE TO RELATED APPLICATION

This application is a U.S. National Stage filing under 35 U.S.C. 119, based on and claiming benefits of and priority to Indian Application No. 201811035754 filed on Sep. 22, 2018. The entire disclosure of the above application is incorporated by reference herein for all purposes.

FIELD OF THE INVENTION

The present invention relates to the field of electronic payment transactions, and more specifically to methods and systems for reducing user interventions necessary for authentication of payment card based electronic payment transactions.

BACKGROUND OF THE INVENTION

Electronic transactions and payments using payment cards or electronic payment accounts are increasingly common—with the number of electronic payment transactions and ubiquity of electronic transaction mechanisms and services growing steadily.

Electronic transaction systems uniformly implement one or more authentication mechanisms to ensure that requested transactions are only permitted if received from an authorized individual/entity. Authentication mechanisms include several different approaches, including for example, single-factor authentication or multi-factor authentication. Authentication mechanisms can also vary depending on a required level of security—for example, low security transactions can rely on static password/passcode type authentication, while higher security transactions can require one or more of multi-factor authentication, dynamic password generation, biometric authentication, etc.

FIG. 1 illustrates a prior art system 100 that can be used for implementing electronic transactions based on a payment card or payment card information presented by a card holder at a terminal device 102. In certain embodiments of the present invention, system 100 may be modified to implement the invention. System 100 includes terminal device 102, acquirer network 104, card network 106 and issuer network 108. While FIG. 1 has been used to illustrate a payment card based network, it would be understood that similar principles and one or more entities having some or all of the same functions may be used to effect payments through any electronic transaction account.

Acquirer network 104 may be communicably coupled with terminal device 102, and comprises acquirer server 104a, acquirer network database 104b and interface gateway 104c. Acquirer server 104a may be configured to receive and process information relating to payment card transactions. In an embodiment, the acquirer network may receive or process transactions received only from merchants having a merchant account with the acquirer—which determination may be made based on information retrieved from acquirer network database 104b. Interface gateway 104c may include a hardware or software network gateway configured to enable acquirer network 104 to communicate with card network 106.

Card network 106 may be communicably coupled to both acquirer network 104 and issuer network 108.

Issuer network 108 comprises issuer server 108a, issuer network database 108b and interface gateway 108c. Issuer server 108a may be configured to receive and process information relating to payment card transactions. In an embodiment, the issuer network may only receive or process transactions received from merchants having a merchant account with the issuer—which determination may be made based on information retrieved from issuer network database 108b. Interface gateway 108c may include a hardware or software network gateway configured to enable issuer network 108 to communicate with card network 106.

Terminal device 102 may comprise any terminal device including without limitation a POS terminal device 102a, computing device 102b, or mobile phone or smartphone or other mobile communication device 102c.

In the system of FIG. 1, issuer network 108 may be configured to authenticate the identity of an individual presenting a payment card for executing a payment transaction—as a precondition to authorizing a requested payment transaction received from a POS terminal 102a or from any other terminal device 102. In various embodiments known in the prior art, this authentication is implemented through a password/personal identification number (PIN)/one time password (OTP), wherein the issuer network implements a challenge-response type authentication mechanism, through which the user who seeks to execute a payment transaction can submit a password/PIN/OTP to the issuer network, and the submitted password/PIN/OTP can be compared against a stored password/PIN/OTP associated with the legitimate/authorized holder of the payment card.

Subject to a match between the submitted password/PIN/OTP and the stored password/PIN/OTP associated with the legitimate or authorized holder of the payment card, the identity of said user is authenticated and the issuer network proceeds to authorize the requested payment transaction.

FIG. 2 illustrates an exemplary sub-system 200 within issuer network 108, comprising issuer server 202 communicably coupled with authentication server 204. In the illustrated embodiment, responsive to issuer server 202 receiving a payment transaction request from acquirer network 104 through card network 106, issuer server 202 initiates an authentication process flow at authentication server 204—whereinafter authentication server 204 initiates and concludes a challenge-response type authentication process (for example, static password/passcode type authentication, multi-factor authentication, dynamic password based authentication, biometric authentication) with the terminal device 102.

It has however been found that incorporation of an authentication process using one or more of passwords/passcodes/dynamic passwords, personal identification numbers, biometric authentication etc., is viewed by card holders as being inconvenient and often causes card holders to forego electronic payment transactions entirely, and to rely on cash based payments instead—rather than having to first swipe a payment card or initiate an electronic payment transaction and then go through an authentication process for the card that has been swiped or the electronic payment account that is being used for the transaction.

There is accordingly a need to streamline the authentication process for payment card/payment account based transactions, by reducing user interventions necessary for authentication of such transactions.

SUMMARY

The invention relates to methods and systems for reducing user interventions necessary for authentication of electronic payment transactions.

In an embodiment the invention, provides a method for authentication of an electronic transaction. The method comprises (i) receiving from a POS terminal a payment transaction request, and information identifying a first payment card for implementing the payment transaction request, (ii) receiving from a wireless access point that is in wireless network communication with a mobile communication device, information corresponding to a set of payment cards enrolled with a mobile payment wallet implemented on said mobile communication device, wherein said set of payment cards includes one or more payment cards, (iii) determining whether received information corresponding to the first payment card matches received information corresponding to any payment card within the set of payment cards enrolled with the mobile payment wallet, and (iv) responsive to the received information corresponding to the first payment card matching received information corresponding to a payment card within the set of payment cards enrolled with the mobile payment wallet, implementing the requested payment transaction based on the first payment card.

In an embodiment, responsive to the received information corresponding to the first payment card matching received information corresponding to a payment card within the set of payment cards enrolled with the mobile payment wallet, the requested payment transaction is implemented based on the first payment card without a prior authentication of identity of the individual presenting the first payment card for the requested payment card transaction.

The method may additionally include authenticating identity of the individual presenting the first payment card for the requested payment card transaction in response to the received information corresponding to the first payment card not matching received information corresponding to any payment card within the set of payment cards enrolled with the mobile payment wallet.

The requested payment transaction may be implemented responsive to determining that the requested payment transaction is a transaction permitted by the issuer network.

In an embodiment of the method, determining that the requested payment transaction is a transaction permitted by the issuer network, comprises (i) determining whether the mobile communication device has implemented thereon, application software associated with an issuer of the first payment card and configured to interface with an issuer network corresponding to said issuer for retrieving and storing information concerning transaction permissions associated with said first payment card, and (ii) responsive to the mobile communication device having implemented thereon, application software associated with an issuer of the first payment card and configured to interface with an issuer network corresponding to said issuer for retrieving and storing information concerning transaction permissions associated with said first payment card, querying said application software information for information whether the requested payment transaction based on the first payment card is a permitted transaction.

Determining that the requested payment transaction is a transaction permitted by the issuer network may comprise (i) determining whether the mobile communication device has implemented thereon, application software associated with an issuer of the first payment card and configured to interface with an issuer network corresponding to said issuer for retrieving and storing information concerning transaction permissions associated with said first payment card, and (ii) responsive to the mobile communication device not having implemented thereon, application software associated with an issuer of the first payment card and configured to interface with an issuer network corresponding to said issuer for retrieving and storing information concerning transaction permissions associated with said first payment card, querying the issuer network for information whether the requested payment transaction based on the first payment card is a permitted transaction.

The wireless access point may be configured to have an effective wireless communication range of up to 2 meters from a location of the POS terminal.

The invention may additionally provide a system for authentication of an electronic transaction, comprising a processor implemented server configured to (i) receive from a POS terminal a payment transaction request and information identifying a first payment card for implementing the payment transaction request, (ii) receive from a wireless access point that is in wireless network communication with a mobile communication device, information corresponding to a set of payment cards enrolled with a mobile payment wallet implemented on said mobile communication device, wherein said set of payment cards includes one or more payment cards, (iii) determine whether received information corresponding to the first payment card matches received information corresponding to any payment card within the set of payment cards enrolled with the mobile payment wallet, and (iv) responsive to the received information corresponding to the first payment card matching received information corresponding to a payment card within the set of payment cards enrolled with the mobile payment wallet, implement the requested payment transaction based on the first payment card.

The processor implemented server may be configured such that responsive to the received information corresponding to the first payment card matching received information corresponding to a payment card within the set of payment cards enrolled with the mobile payment wallet, the requested payment transaction is implemented based on the first payment card without a prior authentication of identity of the individual presenting the first payment card for the requested payment card transaction.

The processor implemented server may be configured to authenticate identity of the individual presenting the first payment card for the requested payment card transaction in response to the received information corresponding to the first payment card not matching received information corresponding to any payment card within the set of payment cards enrolled with the mobile payment wallet.

In an embodiment, the processor implemented server is configured to implement the requested payment transaction responsive to determining that the requested payment transaction is a transaction permitted by the issuer network.

The processor implemented server may in another embodiment be configured such that determining that the requested payment transaction is a transaction permitted by the issuer network, comprises (i) determining whether the mobile communication device has implemented thereon, application software associated with an issuer of the first payment card and configured to interface with an issuer network corresponding to said issuer for retrieving and storing information concerning transaction permissions associated with said first payment card, and (ii) responsive to the mobile communication device having implemented thereon, application software associated with an issuer of the first payment card and configured to interface with an issuer network corresponding to said issuer for retrieving and storing information concerning transaction permissions associated with said first payment card, querying said application software information for information whether the requested payment transaction based on the first payment card is a permitted transaction.

The processor implemented server may be configured such that determining that the requested payment transaction is a transaction permitted by the issuer network, comprises (i) determining whether the mobile communication device has implemented thereon, application software associated with an issuer of the first payment card and configured to interface with an issuer network corresponding to said issuer for retrieving and storing information concerning transaction permissions associated with said first payment card, and (ii) responsive to the mobile communication device not having implemented thereon, application software associated with an issuer of the first payment card and configured to interface with an issuer network corresponding to said issuer for retrieving and storing information concerning transaction permissions associated with said first payment card, querying the issuer network for information whether the requested payment transaction based on the first payment card is a permitted transaction.

In a system embodiment, the wireless access point is configured to have an effective wireless communication range of up to 2 meters from a location of the POS terminal.

The invention may further provide a computer program product for authentication of an electronic transaction, comprising a non-transitory computer usable medium having computer readable program code embodied therein, the computer readable program code comprising instructions for (i) receiving from a POS terminal a payment transaction request, and (ii) information identifying a first payment card for implementing the payment transaction request, (iii) receiving from a wireless access point that is in wireless network communication with a mobile communication device, information corresponding to a set of payment cards enrolled with a mobile payment wallet implemented on said mobile communication device, wherein said set of payment cards includes one or more payment cards, (iv) determining whether received information corresponding to the first payment card matches received information corresponding to any payment card within the set of payment cards enrolled with the mobile payment wallet, and (v) responsive to the received information corresponding to the first payment card matching received information corresponding to a payment card within the set of payment cards enrolled with the mobile payment wallet, implementing the requested payment transaction based on the first payment card.

BRIEF DESCRIPTION OF THE ACCOMPANYING DRAWINGS

DETAILED DESCRIPTION

Figure 1:
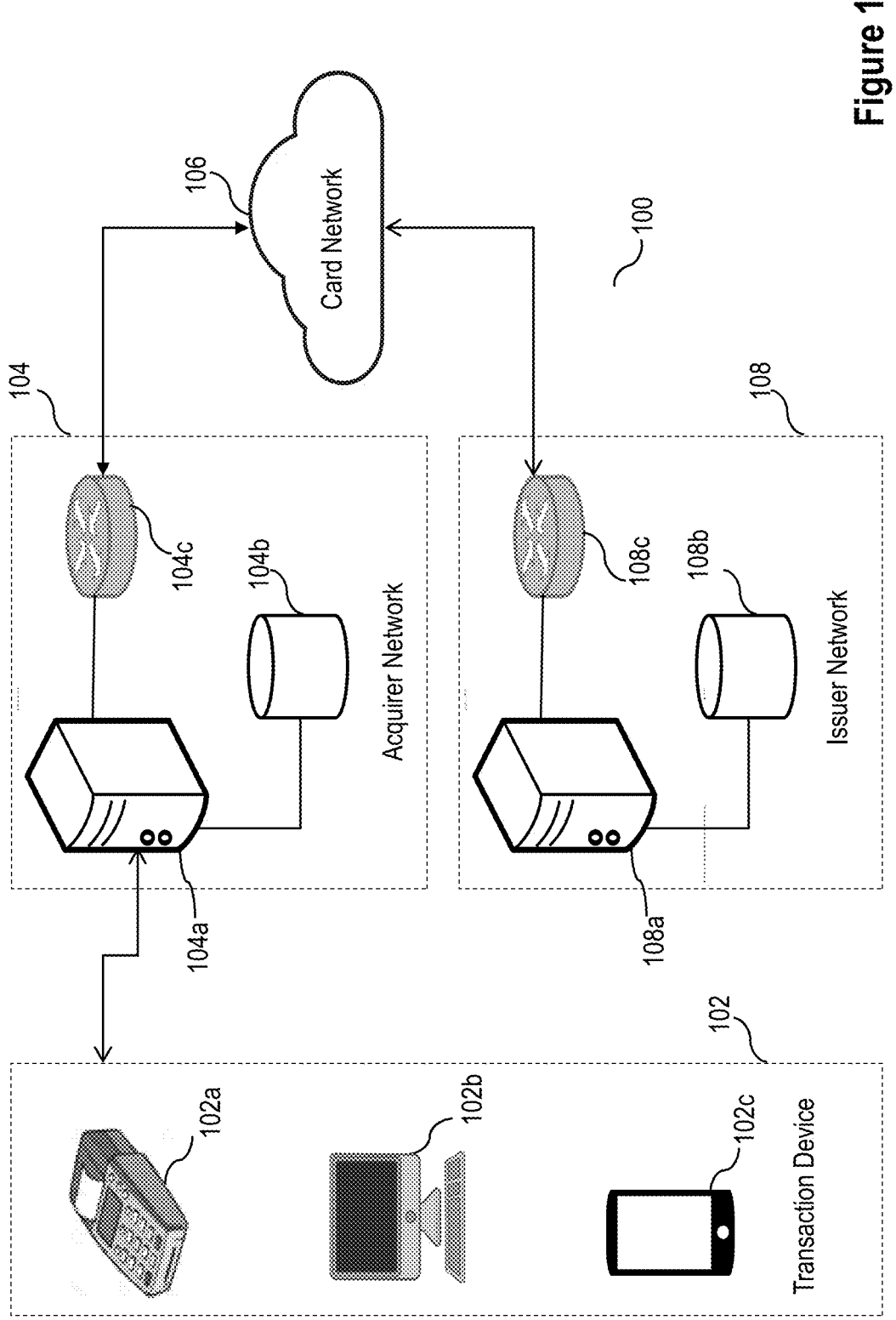
FIG. 1 illustrates a prior art system for authenticating and implementing electronic transactions through a payment card transaction system.
Figure 2:
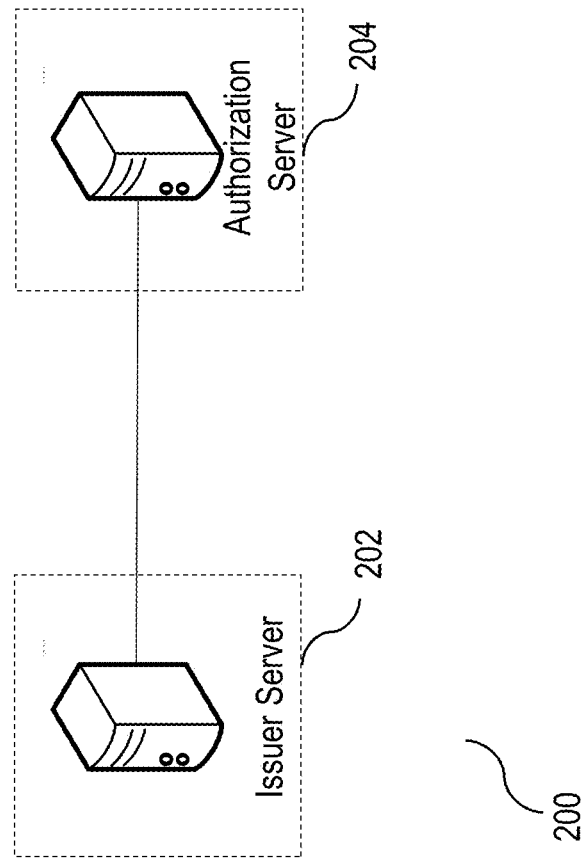
FIG. 2 illustrates issuer network components of the system of FIG. 1.

The present invention provides secure authentication mechanisms for electronic payment transactions while reducing user interventions necessary to effect such electronic payment transactions.

The invention is premised on the understanding that the requirement for a separate authentication step as a prerequisite to authorizing a payment card based transaction can be done away with in a retail environment, by enabling a direct network communication link between a wireless access point provided by a merchant and a mobile wallet implemented on a mobile communication device associated with a payment card holder.

For the purposes of the present invention, the following terms shall be understood to have the corresponding meanings provided below:

"Acquirer" shall mean a business (e.g., a financial institution or a merchant bank) that contracts with a merchant to coordinate with the issuer network of a customers' payment card.

"Acquirer network" shall refer to a communication network, including hardware, software and other equipment used by an acquirer to transmit and process card based transactions and information related to merchants, customers, payment cards and transactions.

"Card holder" or "Customer" shall mean an authorized payment card user who is making a purchase or effecting an electronic transaction with a payment card.

"Card network" shall refer to the intermediary between the merchant's acquirer and the customer's issuer (for example, MasterCard® or Visa®). The card network primarily coordinates payment card transactions between acquirers and issuers, and additionally coordinates clearing and settlement services to transfer payments from issuers to merchants.

"Issuer" shall mean a financial institution that issues payment cards and maintains a contract with a customer or card holder for repayment or settlement of purchases made on the payment card.

"Issuer network" shall refer to a communication network, including hardware, software and other equipment used by an issuer to transmit and process payment card transactions and information related to customers, payment cards and transactions.

"Merchant" shall mean an authorized acceptor of payment cards for the payment of goods or services sold by the merchant.

"Payment card" shall mean a card or data associated with a payment account that may be provided to a merchant in order to fund a financial transaction via the associated payment account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated payment account (e.g., as stored in a communication device, such as a smart phone or computer). For example, in some instances, data including a payment account number may be considered a payment card for the processing of a transaction funded by the associated payment account. In some instances, a check may be considered a payment card where applicable.

"Payment account" shall mean any account that may be used for the purposes of effecting an electronic payment or electronic transaction, and shall include any electronic transaction account, payment card account, bank account or electronic wallet account.

Figure 3:
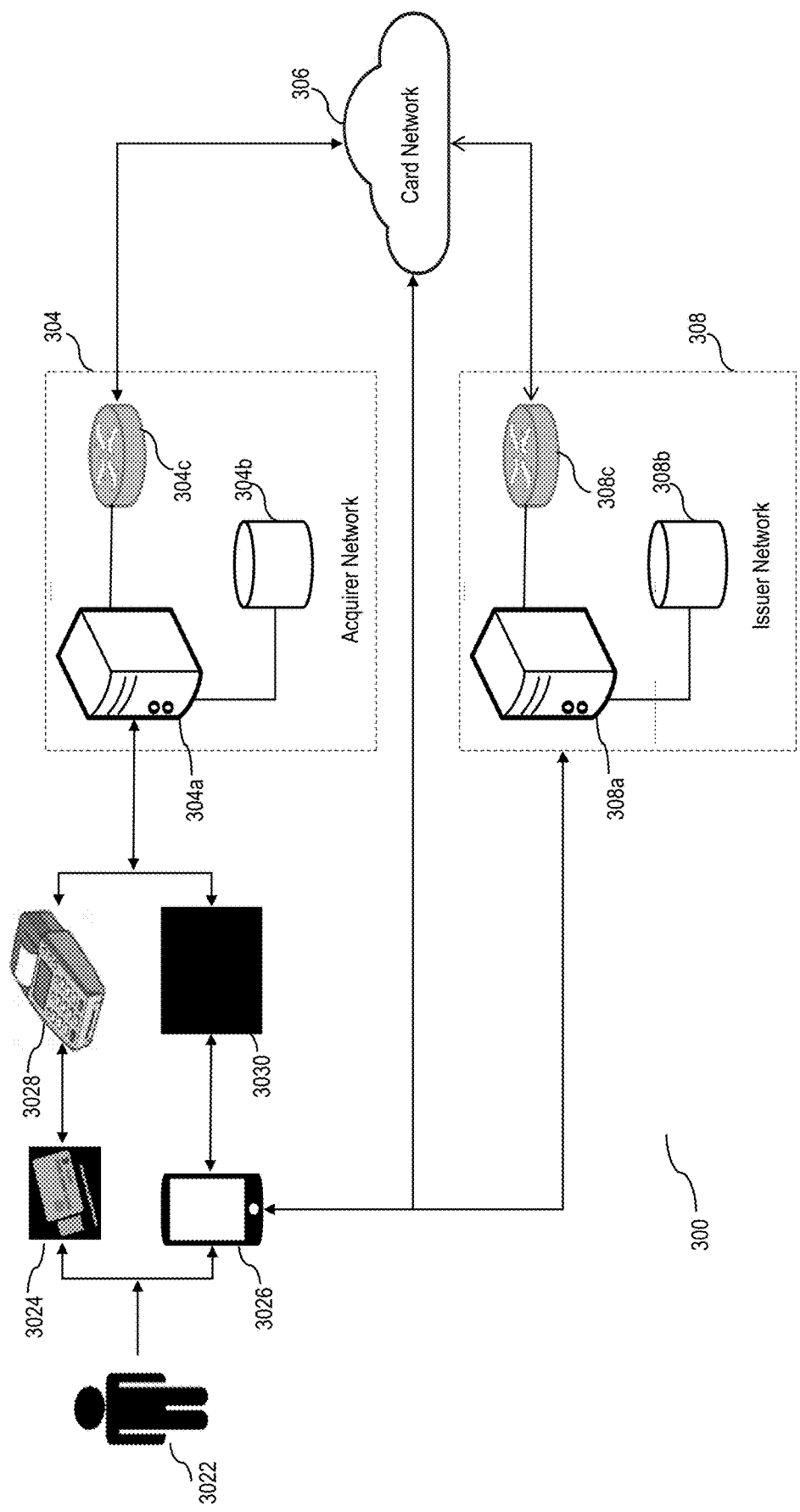
FIG. 3 illustrates a system for authenticating and implementing electronic transactions through a payment card transaction system in accordance with the present invention.

FIG. 3 illustrates a system 300 configured for implementing electronic payment transactions based on a payment card or payment card information presented by a card holder 3022 at a POS terminal 3030—in accordance with the present invention.

System 300 includes a merchant POS terminal 3028 configured to execute payment card 3024 based electronic payment transactions, and also includes a merchant wireless access point 3030 configured to wirelessly pair with and to send data to and receive data from a customer mobile communication device 3026. Each of POS terminal 3028 and wireless access point 3030 are additionally communicatively coupled with acquirer network 304. In an embodiment of the invention, wireless access point 3030 may be integrated into POS terminal 3028. In a particular embodiment of the invention, wireless access point 3030 may be configured to have a predefined wireless communication footprint, wherein said communication footprint is restricted to a range of 5 meters or less (and more preferably 2 meters or less) from the location of wireless access point 3030. In another particular embodiment of the invention, wireless access point 3030 may be configured to have a predefined wireless communication footprint, wherein said communication footprint is restricted to a range of 2 meters or less from the location of POS terminal 3028. In another embodiment of the invention, from the location of POS terminal 3028. In various embodiments, wireless access point 3030 may be configured to include any one or more of 1G, 2G, 3G, 4G, LTE, GPRS, EDGE, GPS, cellular, satellite, wifi, Bluetooth, Bluetooth lite, infrared, ultrasonic, near-field-communication (NFC), or RFID-based wireless communication capabilities. The respective functionalities of each of POS terminal 3028 and wireless access point 3030 are discussed in more detail in connection with the methods described hereinbelow.

Acquirer network 304 may be configured for direct or indirect network communication with communicably coupled with both of POS terminal 3028 and wireless access point 3030, and comprises acquirer server 304a, acquirer network database 304b and interface gateway 304c. Acquirer server 304a may be configured to receive and process information relating to payment card transactions. In a particular embodiment, the acquirer network may receive or process transactions received only from merchants having a merchant account with the acquirer—which determination may be made based on information retrieved from acquirer network database 304b. Interface gateway 304c may include a hardware or software network gateway configured to enable acquirer network 304 to communicate with card network 306.

Card network 306 may be communicably coupled to both acquirer network 304 and issuer network 308.

Issuer network 308 comprises issuer server 308a, issuer network database 308b and interface gateway 308c. Issuer server 308a may be configured to receive and process information relating to payment card transactions. In an embodiment, the issuer network may only receive or process transactions received from merchants having a merchant account with the issuer—which determination may be made based on information retrieved from issuer network database 308b. Interface gateway 308c may include a hardware or software network gateway configured to enable issuer network 308 to communicate with card network 306.

Figure 4:
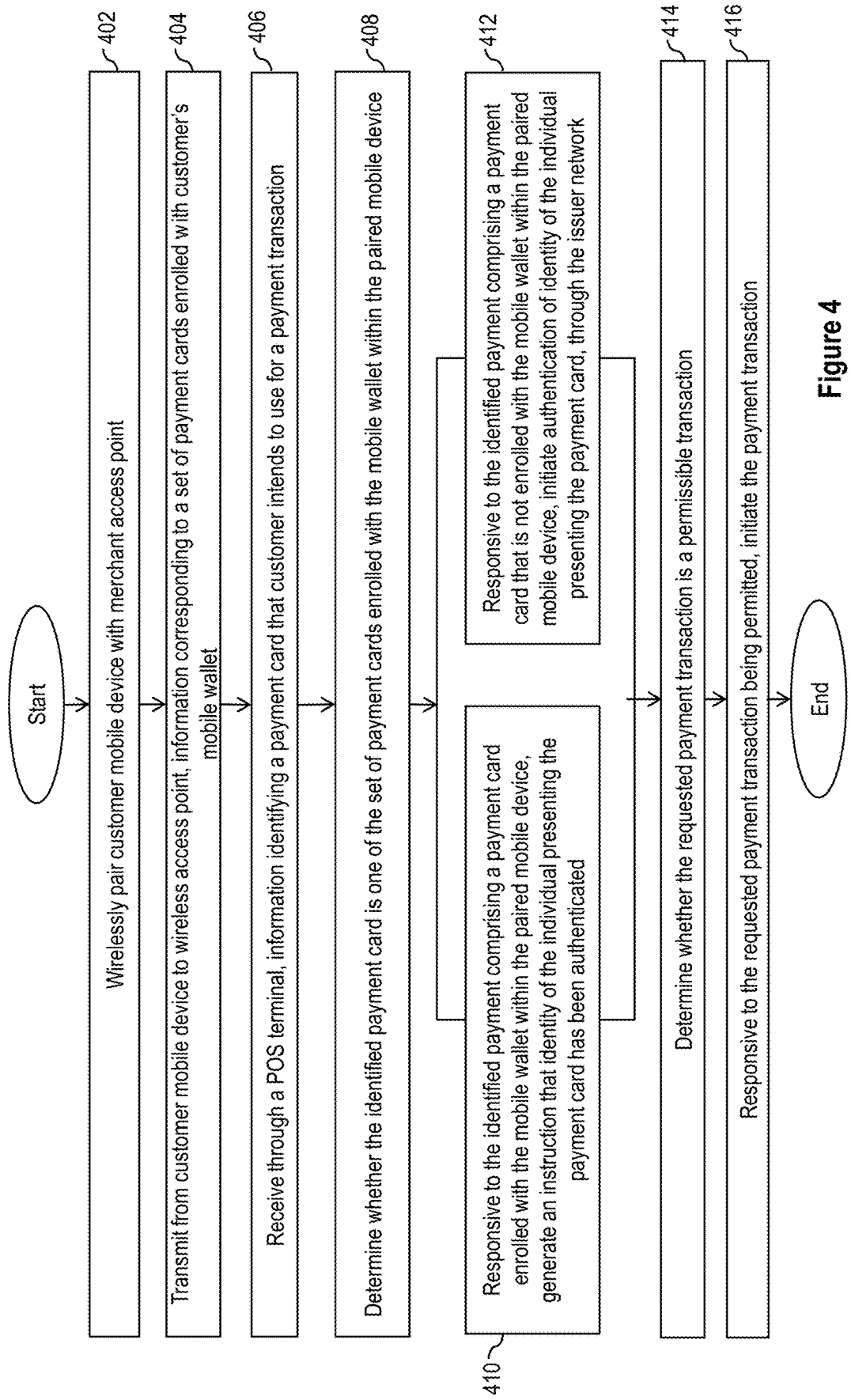
FIGS. 4 and 6 illustrate method embodiments of the present invention.

FIG. 4 illustrates a method of implementing a payment transaction in accordance with the present invention.

Step 402 of FIG. 4 comprises the step of wirelessly pairing a customer mobile communication device 3026 with wireless access point 3030 when the customer mobile communication device is within communication range of wireless access point 3030. In an embodiment of the invention where the wireless access point 3030 is configured so as to have a communication footprint extending up to a defined distance range from the location of POS terminal 3028 (for example a maximum coverage range of 2 meters or less from the location of POS terminal 3028), or extending up to a defined distance range from the location of wireless access point 3030 (for example a maximum coverage range of 5 meters, and more preferably 2 meters or less, from the location of wireless access point 3030).

Subsequent to customer mobile communication device 3026 being wirelessly paired (or otherwise establishing a network communication session) with wireless access point 3030, step 404 comprises transmitting from the customer mobile communicate device 3026 to wireless access point 3030, information corresponding to each of a set of payment cards enrolled with the customer's mobile wallet. In an embodiment of the method, the information corresponding to each payment card enrolled with the customer's mobile wallet may comprise one or more of card number, cardholder name, expiry date, and CVC or CVV number associated with said payment card. In a further embodiment, the set of payment cards enrolled with the customer's mobile wallet may comprise one or more than one payment cards.

Step 406 comprises receiving through POS terminal 3028, information identifying a payment card that the customer intends to use for a payment transaction. In an embodiment of the method, the information corresponding to said payment card that is intended for use for the payment transaction may comprise one or more of card number, cardholder name, expiry date, and CVC or CVV number associated with said payment card. In further embodiment, said information may be received by swiping the payment card at the POS terminal or by manual input of information through a data entry interface at a POS terminal or by a combination of both.

Step 408 comprises determining whether the payment card identified at step 406 matches any of the payment cards within the set of payment cards that are enrolled with the mobile wallet within the paired mobile communication device 3026. In an embodiment, step 408 only matches the payment card identified at step 406 against payment cards enrolled with mobile wallets implemented in mobile communication devices that are currently (i.e. at the time of the identification step of 406) paired (or otherwise in network communication) with wireless access point 3030 or that are within communication range of wireless access point 3030.

Responsive to determining that the identified payment card comprises a payment card enrolled with the mobile wallet installed within a customer mobile communication device that is paired with or is in network communication with wireless access point 3030, step 410 comprises generating an instruction or updating a flag indicating that identity of the individual presenting the payment card has been authenticated.

Alternatively, responsive to determining that the identified payment card does not match any payment card enrolled with the mobile wallet within a customer mobile communication device that is paired with or is in network communication with wireless access point 3030, step 412 comprises initiating a process for authentication of identity of the individual presenting the payment card, through an identity authentication system implemented by an issuer network corresponding to the payment card that has been presented at POS terminal 3028 for making the payment transaction.

In various embodiments, said identity authentication system or method may involve a challenge-response type authentication process (for example, authentication based on static password/passcode type authentication, multi-factor authentication, dynamic password based authentication, biometric authentication etc.) through the POS terminal 3028 or through customer mobile communication device 3026.

In addition to authenticating the identity of the individual presenting the payment card for carrying out the payment transaction either in accordance with step 410 or step 412, step 414 comprises determining whether the requested payment transaction is a permissible transaction—i.e. whether the payment card or a payment account associated with the payment card is authorized to make the payment transaction (for example, whether the payment transaction is within a permissible transaction amount limit, or whether the payment transaction is of a permitted transaction type, or whether the merchant involved is a merchant to whom payments are permitted through an electronic payment mechanism). More specific embodiments of the determination of step 414 are discussed subsequently in connection with FIGS. 6 to 7B.

At step 416, responsive to a determination that the requested payment transaction is a permitted transaction, the payment transaction is initiated and concluded. It would be understood that in certain embodiments step 416 may occur prior to, simultaneously with, or subsequent to steps 412 and/or 414.

Figure 5A:
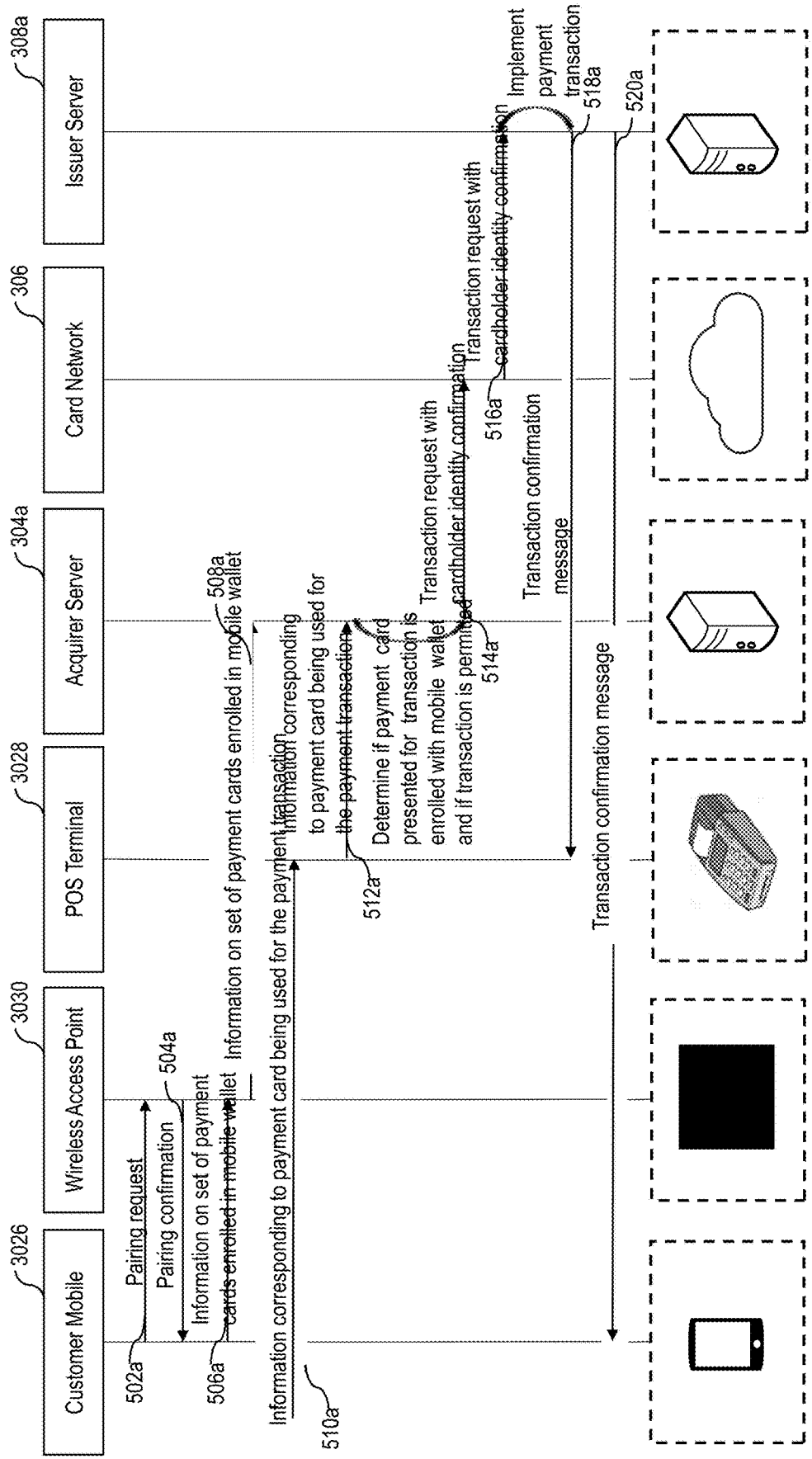
FIGS. 5A and 5B illustrate communication flow diagrams illustrating communication flow within the system of FIG. 3, for implementing the method of FIG. 4.

FIG. 5A illustrates a communication flow between components of system 300 (shown in FIG. 3) for implementing the method of FIG. 4—wherein the method involves implementation of step 410 after step 408.

The method commences at step 502a wherein a customer mobile communication device 3026 is within communication range of a merchant's wireless access point 3030, detects said wireless access point 3030 and sends a pairing request to wireless access point 3030. At step 504a, wireless access point 3030 sends an acknowledgement and/or pairing confirmation back to customer mobile communication device, which leads to the pairing process being successfully completed. It would be understood that in certain embodiments the mobile communication device 3026 and wireless access point 3030 may through steps 502a and 504a establish a communication session through communication protocols that do not involve pairing.

At step 506a information corresponding to a set of payment cards enrolled with a mobile wallet installed on the customer mobile communication device 3026 is transmitted from customer mobile communication device 3026 to wireless access point 3030. Said information corresponding to the set of payment cards is forwarded at step 508a from wireless access point 330 to acquirer server 304a.

At step 510a, POS terminal 3028 receives information identifying a payment card that the customer intends to use for a payment transaction. In an embodiment of the method, the information corresponding to said payment card that is intended for use for the payment transaction may comprise one or more of card number, cardholder name, expiry date, and CVC or CVV number associated with said payment card. In further embodiment, said information may be received by swiping the payment card at the POS terminal 3028 or by manual input of information through a data entry interface or by a combination of both. This information is transmitted from POS terminal 3028 to acquirer server 304a at step 512a.

Acquirer server 304a thereafter uses the received information to determine whether (i) the payment card presented for transaction purposes at POS terminal 3028 is enrolled with a mobile wallet installed on communication device 3026 and (ii) the requested transaction is a permitted transaction. It would be understood that these two determinations may occur simultaneously, or in a time phased manner and in any order respective to each other. Subject to determining that both the above conditions are satisfied, step 514a comprises acquirer server 304a transmitting to card network 306, a transaction request corresponding to the transaction payment requested at POS terminal 3028, along with confirmation that the identity of the cardholder presenting the payment card at POS terminal 3028 has been verified/authenticated. Step 516a comprises onward transmission of said transaction request and identity confirmation from card network 306 to issuer server 308a.

Issuer server responds to receiving said transaction request and identity confirmation by implementing the requested payment transaction, and forwarding at steps 518a and 520a, transaction confirmation message(s) to one or both of POS terminal 3028 and customer mobile communication device 3026—without requiring issuer server to initiate an identity authentication workflow to authenticate the identity of the individual presenting the payment card at POS terminal 3028.

Figure 5B:
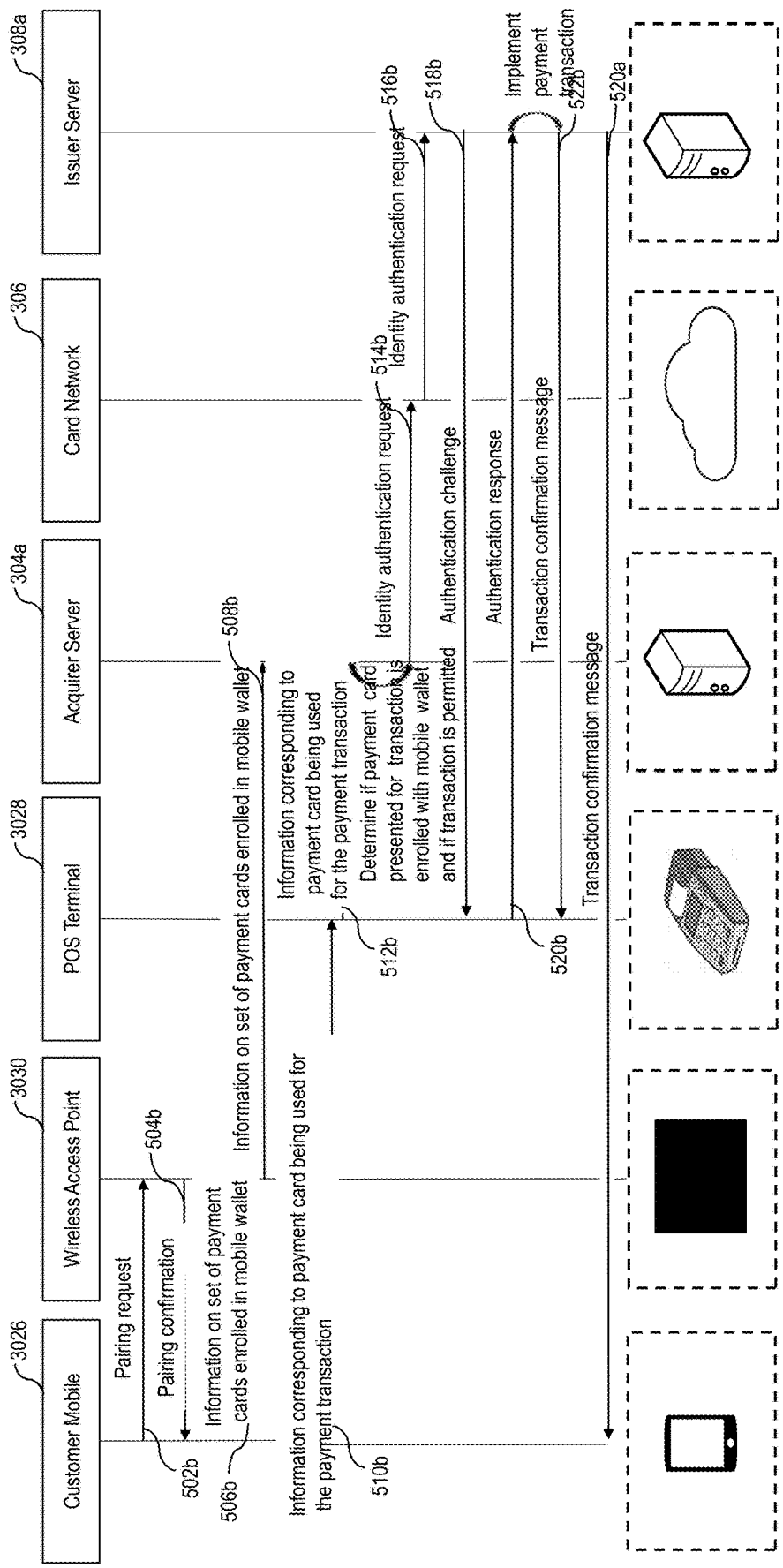

FIG. 5B illustrates a communication flow between components of system 300 (shown in FIG. 3) in implementing the method of FIG. 4—wherein the method involves implementation of step 412 after step 408.

The method commences at step 502b wherein a customer mobile communication device 3026 is within communication range of a merchant's wireless access point 3030, detects said wireless access point 3030 and sends a pairing request to wireless access point 3030. At step 504b, wireless access point 3030 sends an acknowledgement and/or pairing confirmation back to customer mobile communication device, which leads to the pairing process being successfully completed. It would be understood that in certain embodiments the mobile communication device 3026 and wireless access point 3030 may through steps 502b and 504b establish a communication session through communication protocols that do not involve pairing.

At step 506b information corresponding to a set of payment cards enrolled with a mobile wallet installed on the customer mobile communication device 3026 is transmitted from customer mobile communication device 3026 to wireless access point 3030. Said information corresponding to the set of payment cards is forwarded at step 508b from wireless access point 330 to acquirer server 304a.

At step 510b, POS terminal 3028 receives information identifying a payment card that the customer intends to use for a payment transaction. In an embodiment of the method, the information corresponding to said payment card that is intended for use for the payment transaction may comprise one or more of card number, cardholder name, expiry date, and CVC or CVV number associated with said payment card. In further embodiment, said information may be received by swiping the payment card at the POS terminal or by manual input of information through a data entry interface or by a combination of both. This information is transmitted from POS terminal 3028 to acquirer server 304a at step 512b.

Acquirer server 304a thereafter uses the received information to determine whether (i) the payment card presented for transaction purposes at POS terminal 3028 is enrolled with a mobile wallet installed on a communication device 3026 that is paired with or in network communication with wireless access point 3030 and (ii) the requested transaction is a permitted transaction. It would be understood that these two determinations may occur simultaneously, or in a time phased manner. Subject to determining that the payment card presented for transaction purposes at POS terminal 3028 is not enrolled with a mobile wallet installed on communication device 3026 that is paired with or in network communication with wireless access point 3030, step 514b comprises sending an identity authentication request from acquirer server 304a to card network 306, which identity authentication request is transmitted onward at step 516b by card network 306 to issuer server 308a. The identity authentication request transmitted to issuer server 308a may comprise a request for authenticating an identity of the person/individual presenting the payment card at POS terminal 3028.

Responsive to receiving an identity authentication request at issuer server 308a, step 518b comprises issuer server 308a transmitting an authentication challenge to POS terminal 3030 (or in certain embodiments that are not specifically shown) to a customer mobile communication device 3026)—to which authentication challenge, POS terminal 3030 responds at step 520b by sending an authentication response back to issuer server 308a. Subject to verification that the received authentication response is an appropriate response to the transmitted authentication challenge, issuer server 308a determines identity of the person/individual to have been appropriately authentication, and proceeds to implement a requested payment transaction. It will be noted that transmission of a request for execution of the payment transaction from acquirer server 304a to issuer server 308a has not been specifically shown in the communication flow of FIG. 5B, but would occur in the same manner as illustrated in FIG. 5A. Thereafter at steps 522b and 524b, transaction confirmation message(s) may be forwarded by issuer server 308a to one or both of POS terminal 3028 and customer mobile communication device 3026.

Figure 6:
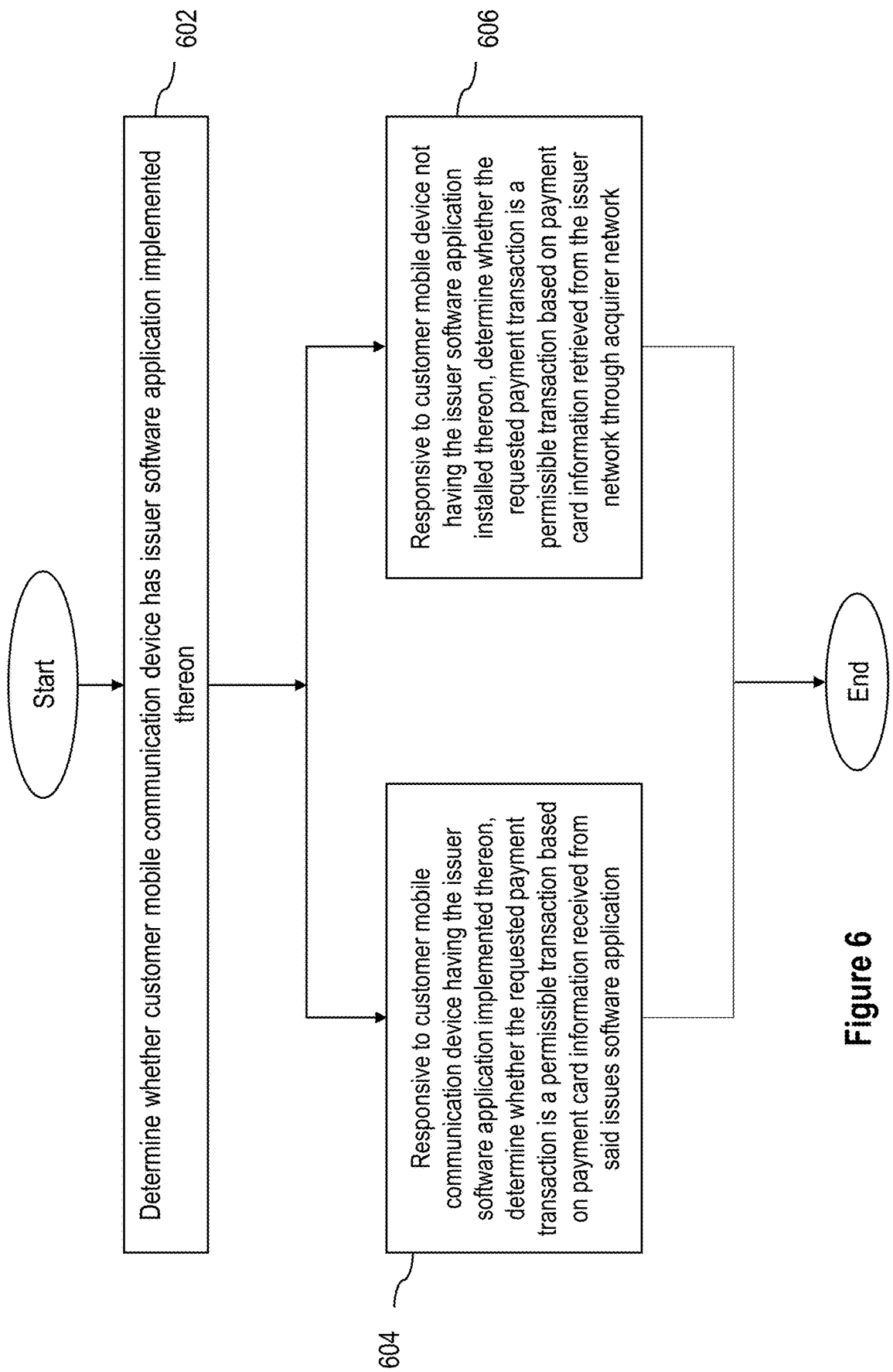

FIG. 6 comprises a flowchart illustrating an embodiment of step 414 of FIG. 4—i.e. an implementation of the step of determining whether the requested payment transaction is a permissible transaction.

Step 602 comprises determining whether the customer mobile communication device 3026 has implemented/installed thereon, application software configured to interface with an issuer network 308a corresponding to a payment card that has been presented at POS terminal 3028 for the purposes of effecting a payment transaction and that is configured retrieve and/or store bank account information or payment card account information corresponding to said payment card from the issuer network 308a (for example a bank software mobile app or a credit card mobile software app)—which information may include information regarding whether a requested payment card transaction is a payment transaction that is permitted by the issuer. In an embodiment said application software comprises application software published by or on behalf of the issuer. In a further embodiment, said determination at step 602 is achieved by acquirer server 304a querying customer mobile communication device 3026.

At step 604, responsive to determining that the customer mobile communication device 3026 has the necessary application software implemented thereon, acquirer server 304a queries said application software and determines based on the query and response process whether the requested payment transaction is a payment transaction that is permissible based on one or more transaction permissions associated with the payment card or with a payment account associated with said payment card. In an embodiment of the method, acquirer server 304a may direct the query to the mobile wallet installed on the customer mobile communication device, and the mobile wallet may be configured to redirect the query to and obtain a response from the application software, and to forward the received response to acquirer server 304a.

Alternatively, at step 606, responsive to determining that the customer mobile communication device 3026 does not have the necessary application software installed thereon, the acquirer server 304a queries issuer server 308a and determines based on query responses from issuer server 308a, whether the requested payment transaction is a payment transaction that is permissible based on one or more transaction permissions associated with the payment card or with a payment account associated with said payment card.

Figure 7A:
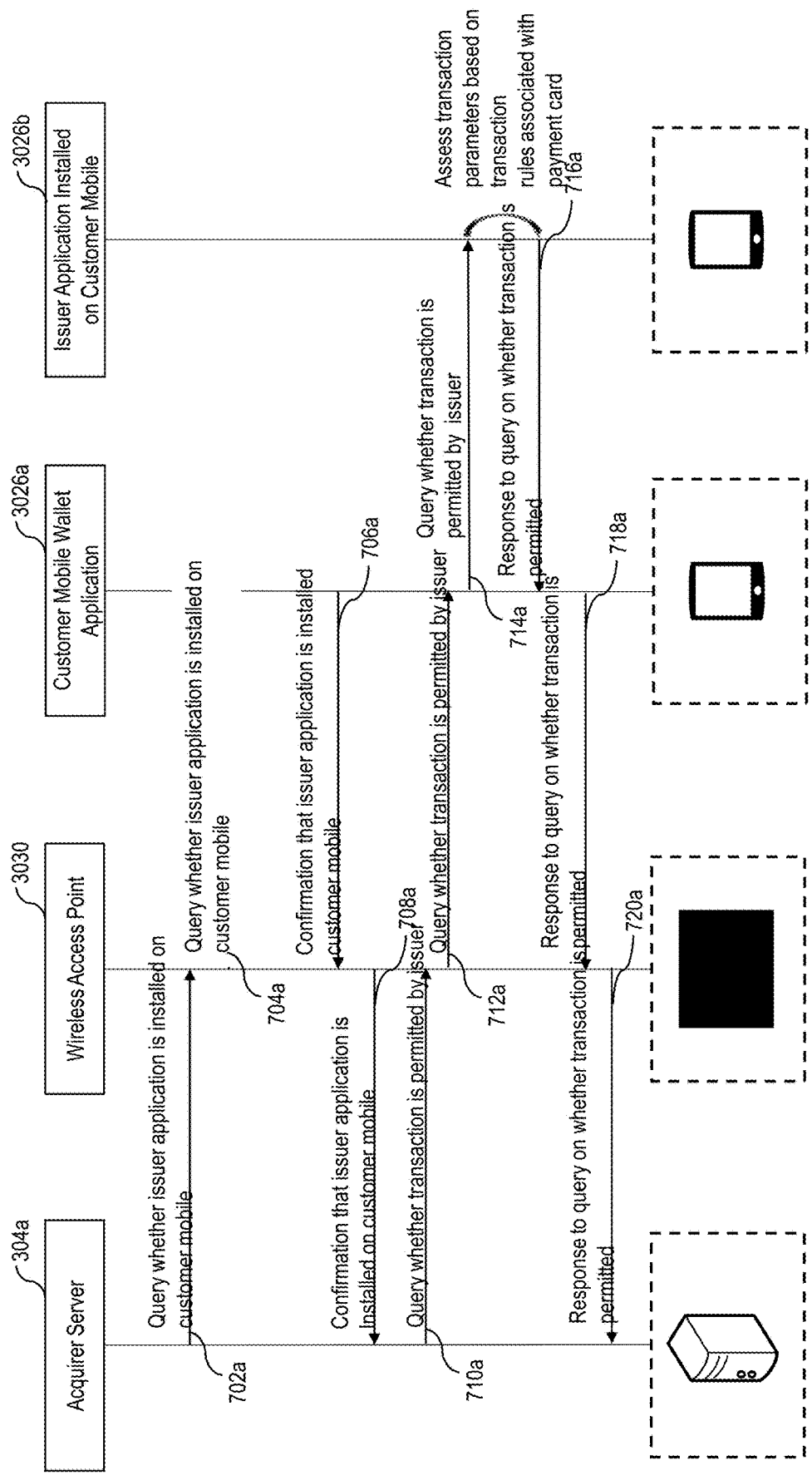
FIGS. 7A and 7B illustrate communication flow diagrams illustrating communication flow within the system of FIG. 3, for implementing the method of FIG. 6.

FIG. 7A illustrates a communication flow between components of system 300 (shown in FIG. 3) in implementing the method of FIG. 6—wherein the method involves implementation of step 604 after step 602.

The method commences at step 702a wherein acquirer server 304a transmits to wireless access point 3030, a query regarding whether customer mobile communication device 3026 has implemented thereon application software (issuer published application software) configured to interface with an issuer network 308a corresponding to a payment card that has been presented at POS terminal 3028 for the purposes of effecting a payment transaction and that is configured retrieve and/or store bank account information or payment card account information corresponding to said payment card from the issuer network 308a. Step 704a comprises wireless access point 3030 transmitting said query onward to a mobile wallet application 3026a that is installed on customer mobile communication device 3026.

Responsive to the customer mobile communication device 3026 having the necessary issuer published application software 3024b installed thereon, said customer mobile communication device transmits a confirmation message to wireless access point 3030 at step 706a, and at step 708a, said confirmation is transmitted onward from wireless access point 3030 to acquirer server 304a.

Subject to receiving the necessary confirmation, step 710a comprises acquirer server 304a transmitting a query message to wireless access point 3030—querying the application software 3024b (the issuer application software installed on customer mobile communication device 3026) as to whether the requested payment transaction is a payment transaction that is permissible based on one or more transaction permissions associated with the payment card or with a payment account associated with said payment card. Said query is transmitted onward to the customer mobile wallet application 3024a. Customer mobile wallet application 3024a and the issuer application 3024b installed on the customer mobile communication device 3026 may be respectively configured to enable the two application softwares to communicate through a query-response communication protocol or other communication protocol. Accordingly, at step 714*a*, customer mobile wallet application 3024*a* transmits to issuer application 3024*b*, the query regarding whether the requested payment transaction is a permitted one.

The issuer application 3024*b* assesses transaction parameters associated with the requested payment card transaction against one or more transaction rules associated with the payment card or an associated payment account, and at step 716*a* transmits a response regarding whether the payment transaction is permitted, back to customer mobile wallet application 3024*a*. Said response is transmitted onward from customer mobile wallet application 3024*a* to wireless access point 3030 at step 718*a*—and further from wireless access point 3030 to acquirer server 304*a* at step 720*a*.

Figure 7B:
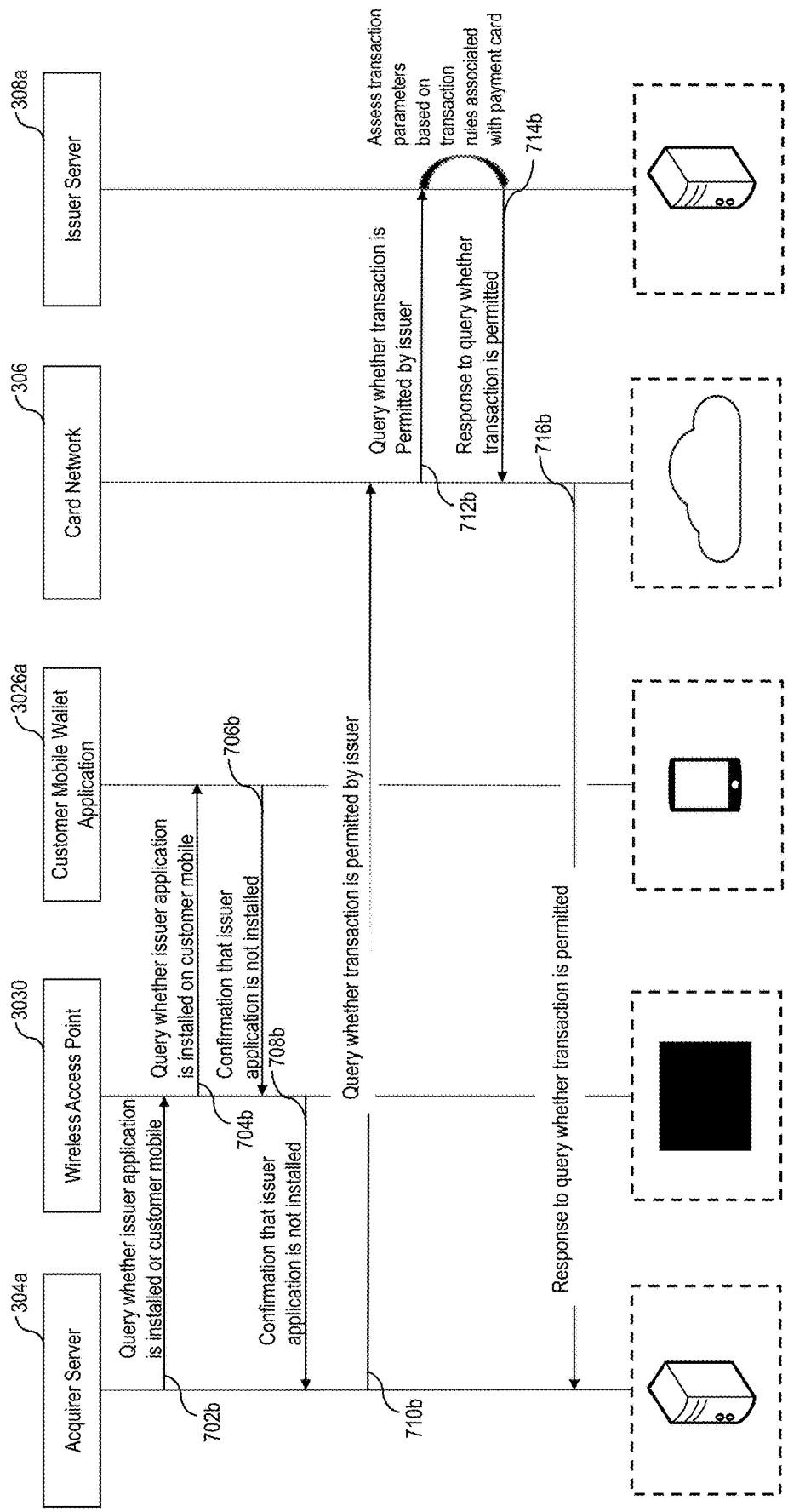

FIG. 7B illustrates a communication flow between components of system 300 (shown in FIG. 3) in implementing the method of FIG. 6—wherein the method involves implementation of step 606 after step 602.

The method commences at step 702*b* wherein acquirer server 304*a* transmits to wireless access point 3030, a query regarding whether customer mobile communication device 3026 has implemented thereon application software (issuer published application software) configured to interface with an issuer network 308*a* corresponding to a payment card that has been presented at POS terminal 3028 for the purposes of effecting a payment transaction and that is configured retrieve and/or store bank account information or payment card account information corresponding to said payment card from the issuer network 308*a*. Step 704*b* comprises wireless access point 3030 transmitting said query onward to a mobile wallet application 3026*a* that is installed on customer mobile communication device 3026.

Responsive to ascertaining that the customer mobile communication device 3026 does not have the necessary issuer published application software 3024*b* installed thereon, said customer mobile communication device transmits a message to wireless access point 3030 at step 706*b* confirming that the necessary issuer published application software 3024*b* is not implemented on the customer, and said message is transmitted onward from wireless access point 3030 to acquirer server 304*a*.

Subject to receiving confirmation that the customer mobile communication device 3026 does not have the necessary issuer published application software 3024*b* installed thereon, step 710*b* comprises acquirer server 304*a* transmitting a query message to card network 306—querying whether the requested payment transaction is a payment transaction that is permissible based on one or more transaction permissions associated with the payment card or with a payment account associated with said payment card. Said query is transmitted onward by card network 306 to issuer server 308*a* at step 712*b*.

Responsive to receiving the query transmitted at step 712*b*, issuer server 308*a* assesses transaction parameters associated with the requested payment card transaction against one or more transaction rules associated with the payment card or an associated payment account, and at step 714*b* transmits a response regarding whether the payment transaction is permitted, to card network 306. Said response is transmitted at step 716*b*, onward from card network 306 to acquirer server 304*a*.

Figure 8:
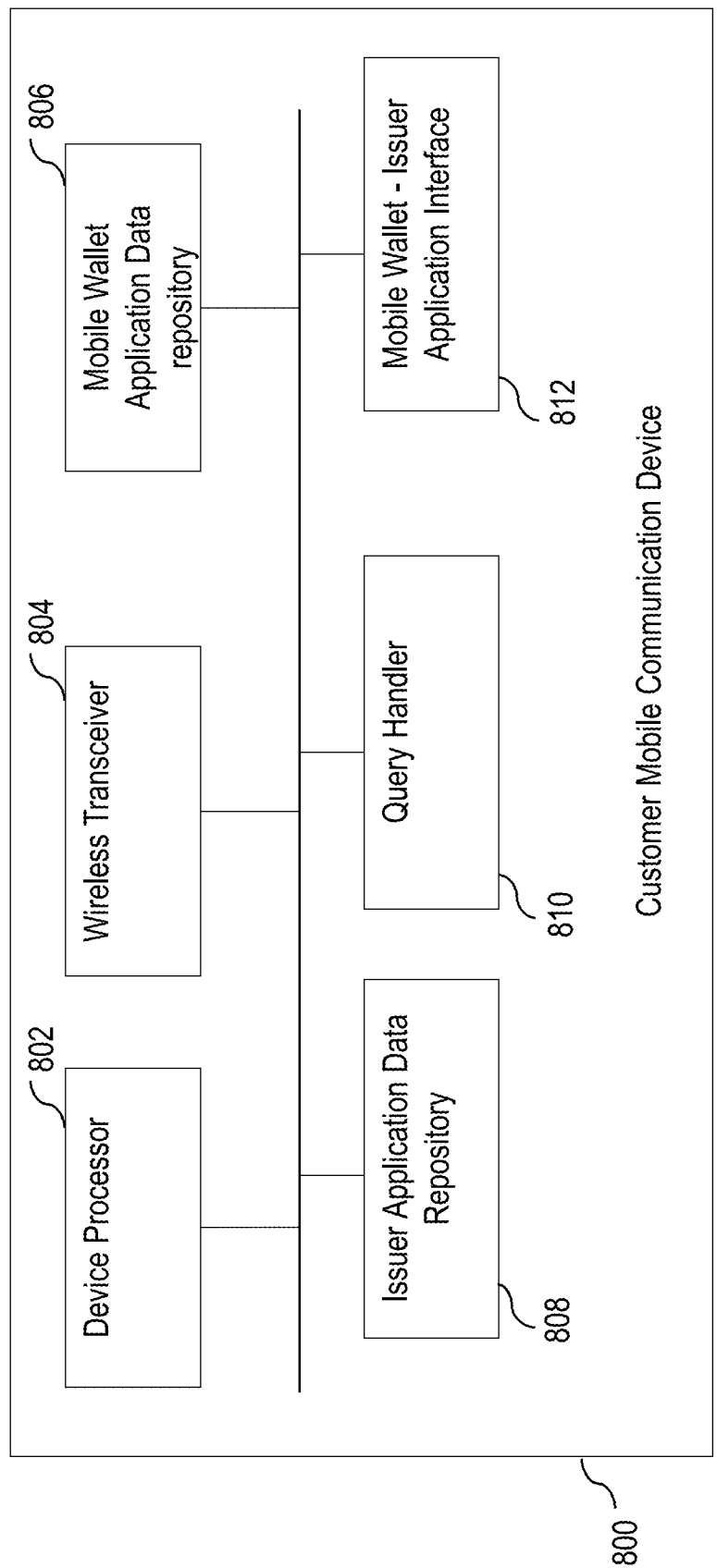
FIG. 8 illustrates an exemplary embodiment of a mobile terminal configured for implementing the teachings of the present invention.

FIG. 8 is a block diagram illustrating components of a customer mobile communication device 800 of a type that has been configured to implement the various features of the present invention. In an embodiment according to the illustration of FIG. 8, customer mobile communication device 800 comprises (i) device processor 802, comprising one or more processors configured to process data and execute functions of customer mobile communication device 800, (ii) wireless transceiver 804, comprising a transmitter and a receiver respectively configured to transmit and receive information over one or more wireless communication protocols, and in an embodiment is configured to communicate with wireless access point 3030 of FIG. 3, (iii) mobile wallet application payment data repository 806, comprising a data repository configured for storing data associated with functionality of the mobile wallet software application, and in a particular embodiment configured to store information corresponding to payment cards enrolled with the customer's mobile wallet, (iv) issuer application data repository 808 comprising a data repository configured for storing data associated with functionality of the mobile wallet software application, which in a particular embodiment is configured to store information corresponding to payment cards enrolled with the customer's mobile wallet, (iv) issuer application data repository 808 configured to store information corresponding to a software application published by an issuer of one or more payment cards or payment accounts, which software application enables retrieval and/or storage of bank account information or payment card account information corresponding to said payment card(s) from the corresponding issuer, (v) query handler 810 comprising a controller configured to queue and handle one or more queries received by the customer mobile communication device 800, and (vi) a mobile wallet—issuer application interface 812, comprising a software communication interface configured to enable data communication between a mobile wallet software application and a software application published by an issuer of one or more payment cards or payment accounts, when both software applications are installed or implemented within customer mobile communication device 800.

Figure 9:
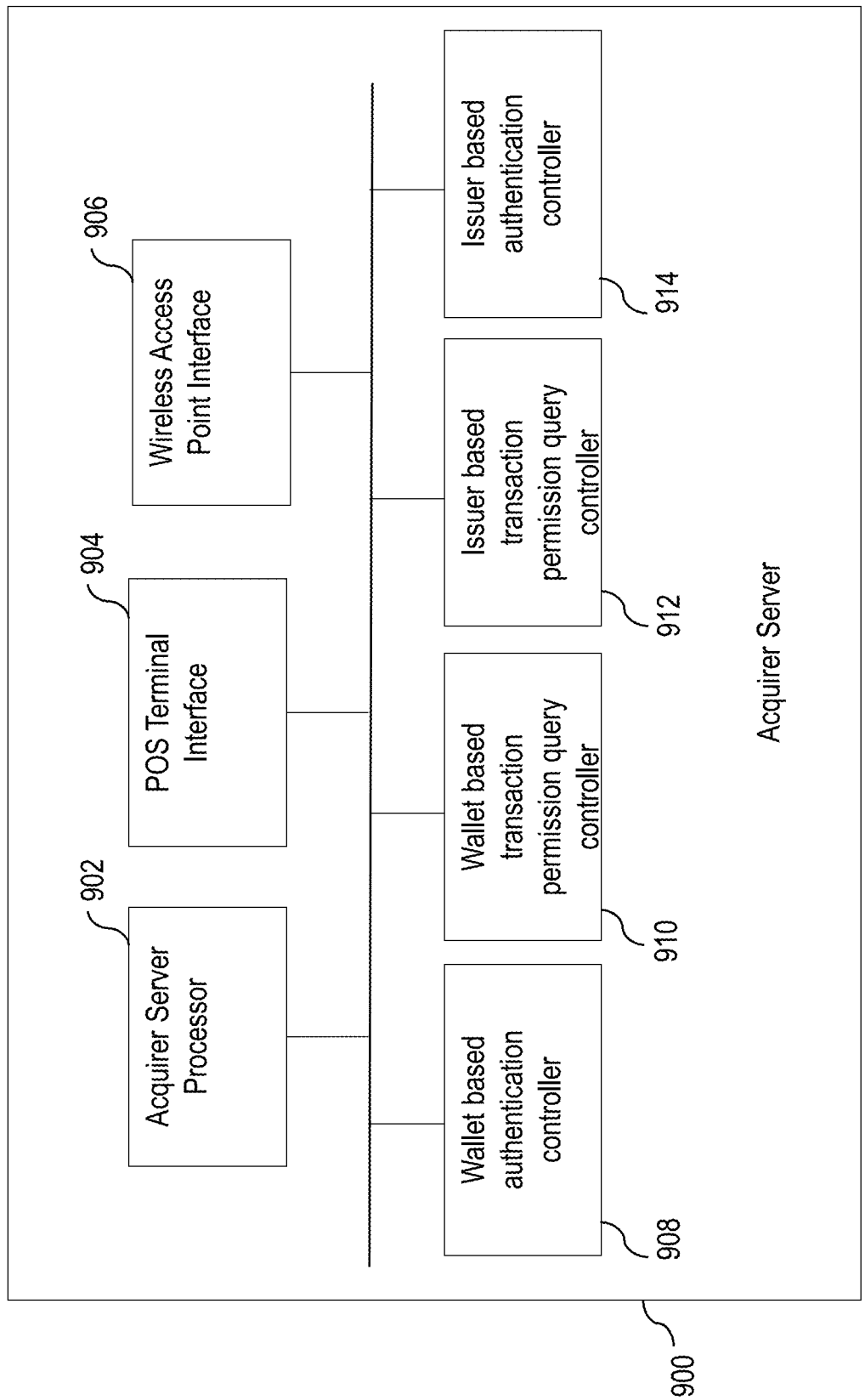
FIG. 9 illustrates an exemplary embodiment of an acquirer server configured for implementing the teachings of the present invention.

FIG. 9 illustrates a block diagram illustrating components of an acquirer server 900 of a type that has been configured to implement the various features of the present invention. In an embodiment according to the illustration of FIG. 9, acquirer server 900 comprises (i) acquirer server processor 902, comprising one or more processors configured to process data and execute functions of acquirer 800, (ii) POS terminal interface 904 comprising one or more software, hardware or hybrid communication interfaces configured to provide a data and communication interface with one or more POS terminals associated with acquirer server 900 and through which acquirer server receives payment transaction information and implements one or more payment transactions, (iii) wireless access point interface 906 comprising one or more software, hardware or hybrid communication interfaces configured to provide a data and communication interface with one or more wireless access points of the type illustrated in FIG. 3 that have been implemented on premises of merchants having one or more POS terminals that are configured to communicate with and implement transactions through acquirer server 900, (iv) wallet based authentication controller 908 comprising one or more controllers configured to enable authentication of identity of a person or entity presenting a payment card at a POS terminal in accordance with the method described in more detail in connection with FIG. 4, (v) wallet based transaction permission query controller 910 comprising one or more controllers configured to ascertain whether a requested payment transaction is a permitted transaction, based on a query-response communication flow with a mobile wallet implemented on a customer mobile communication device, (vi) issuer based transaction permission query controller 912 comprising one or more controllers configured to ascertain whether a requested payment transaction is a permitted transaction, based on a query-response communication flow with an issuer server, and (vii) issuer based authentication controller 914 comprising one or more controllers configured to enable authentication of identity of a person or entity presenting a payment card at a POS terminal, based on a query-response communication flow with an issuer server.

Figure 10:
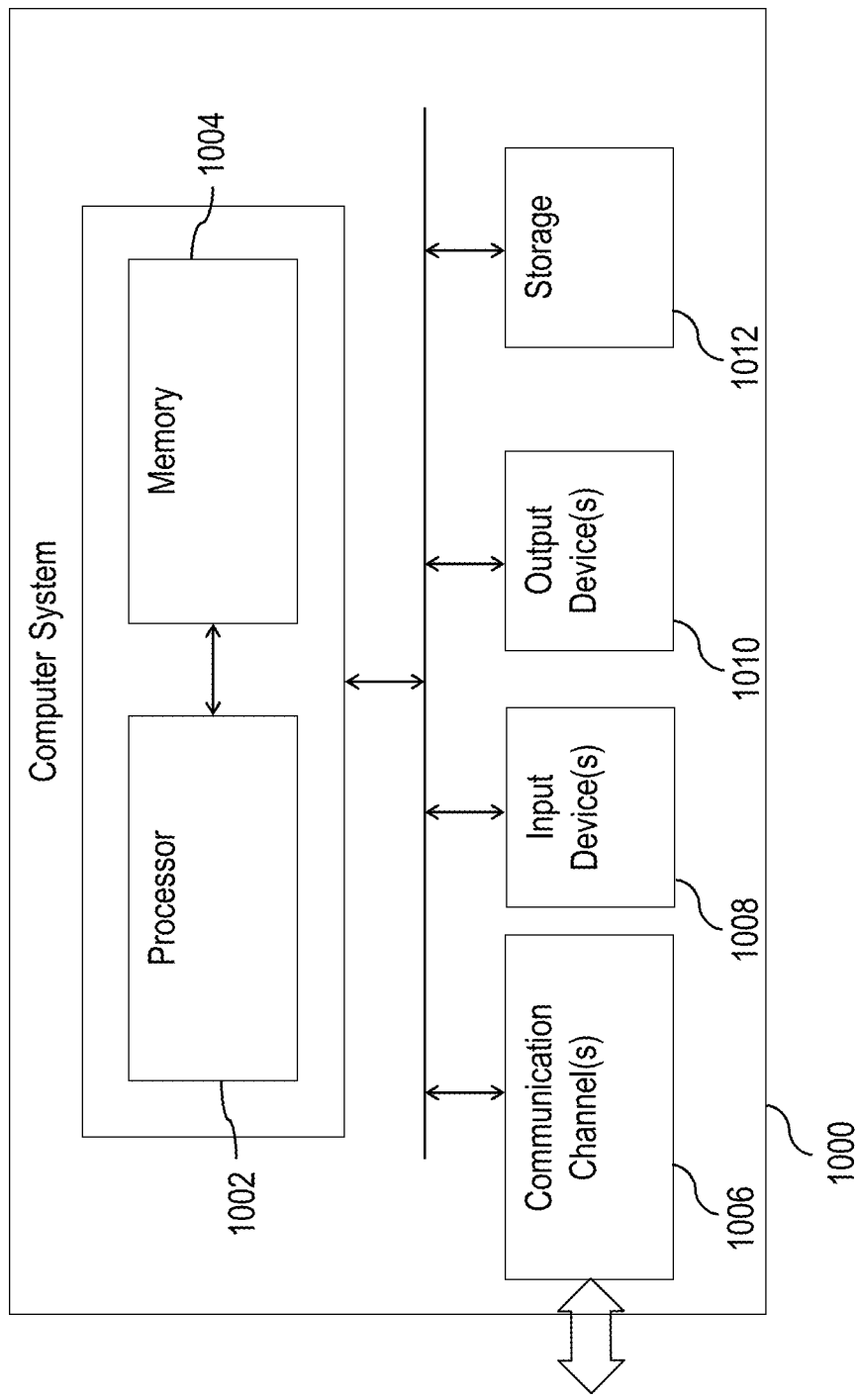
FIG. 10 illustrates an exemplary computer system according to which various embodiments of the present invention may be implemented.

FIG. 10 illustrates an exemplary system 1000 for implementing the present invention.

System 1000 includes computer system 1002 which in turn comprises one or more processors 1004 and at least one memory 1006. Processor 1004 is configured to execute program instructions—and may be a real processor or a virtual processor. It will be understood that computer system 1002 does not suggest any limitation as to scope of use or functionality of described embodiments. The computer system 1002 may include, but is not be limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 1002 in accordance with the present invention may include one or more servers, desktops, laptops, tablets, smart phones, mobile phones, mobile communication devices, tablets, phablets and personal digital assistants. In an embodiment of the present invention, the memory 1006 may store software for implementing various embodiments of the present invention. The computer system 1002 may have additional components. For example, the computer system 1002 may include one or more communication channels 1008, one or more input devices 1010, one or more output devices 1012, and storage 1014. An interconnection mechanism (not shown) such as a bus, controller, or network, interconnects the components of the computer system 1002. In various embodiments of the present invention, operating system software (not shown) provides an operating environment for various softwares executing in the computer system 1002 using a processor 1004, and manages different functionalities of the components of the computer system 1002.

The communication channel(s) 1008 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 1010 may include, but is not limited to, a touch screen, a keyboard, mouse, pen, joystick, trackball, a voice device, a scanning device, or any another device that is capable of providing input to the computer system 1002. In an embodiment of the present invention, the input device(s) 1010 may be a sound card or similar device that accepts audio input in analog or digital form. The output device(s) 1012 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 1002.

The storage 1014 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1002. In various embodiments of the present invention, the storage 1014 may contain program instructions for implementing any of the described embodiments.

In an embodiment of the present invention, the computer system 1002 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 1002. The method described herein is typically implemented as a computer program product, comprising a set of program instructions that is executed by the computer system 1002 or any other similar device. The set of program instructions may be a series of computer readable codes stored on a tangible medium, such as a computer readable storage medium (storage 1014), for example, diskette, CD-ROM, ROM, flash drives or hard disk, or transmittable to the computer system 1002, via a modem or other interface device, over either a tangible medium, including but not limited to optical or analogue communications channel(s) 1008. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

Based on the above, it would be apparent that the present invention offers significant advantages—in particular, by reducing the requirement for user interventions and by offering convenient and secure ways for facilitating passive authentication of a user in connection with electronic or payment card based transactions. The invention offers significant improvement in customer experience due to the fact that the degree of effort or active intervention on the part of the user for commencing and/or carrying out an electronic or payment card based transaction is reduced, while maintaining and improving on security standards.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment that is specifically contemplated, the invention is intended to be practiced in the absence of any one or more element which are not specifically disclosed herein.

We claim:

1. A method for authentication of an electronic transaction, comprising:

sending from a mobile communication device to a wireless access point that is in communication with the mobile communication device, information corresponding to a set of payment cards enrolled with a mobile payment wallet implemented on said mobile communication device, wherein the information is sent for each card in the set and is at least one of a card number, a cardholder name, an expiry date, and a Card Verification Code number; sending from a mobile communication device to a wireless access point that is in communication with the mobile communication device, information corresponding to a set of payment cards enrolled with a mobile payment wallet implemented on said mobile communication device, wherein the information is sent for each card in the set and is at least one of a card number, a cardholder name, an expiry date, and a Card Verification Code number;

receiving from a POS terminal, after the mobile communication device sends the information corresponding to the set of payment cards enrolled with the mobile payment wallet to the wireless access point:
  a payment transaction request; and
  information identifying a first payment card for implementing the payment transaction request;

receiving from the wireless access point, the information corresponding to the set of payment cards enrolled with the mobile payment wallet implemented on said mobile communication device, wherein said set of payment cards includes one or more payment cards;

determining whether the received information corresponding to the first payment card matches received information corresponding to any payment card within the set of payment cards enrolled with the mobile payment wallet; and responsive to the received information corresponding to the first payment card matching received information corresponding to a payment card within the set of payment cards enrolled with the mobile payment wallet, implementing the requested payment transaction based on the first payment card.

2. The method as claimed in claim 1, wherein responsive to the received information corresponding to the first payment card matching received information corresponding to a payment card within the set of payment cards enrolled with the mobile payment wallet, the requested payment transaction is implemented based on the first payment card without a prior authentication of identity of the individual presenting the first payment card for the requested payment card transaction.

3. The method as claimed in claim 1, comprising authenticating identity of the individual presenting the first payment card for the requested payment card transaction in response to the received information corresponding to the first payment card not matching received information corresponding to any payment card within the set of payment cards enrolled with the mobile payment wallet.

4. The method as claimed in claim 1, wherein the requested payment transaction is implemented responsive to determining that the requested payment transaction is a transaction permitted by the issuer network.

5. The method as claimed in claim 4, wherein determining that the requested payment transaction is a transaction permitted by the issuer network, comprises:
  determining whether the mobile communication device has implemented thereon, application software associated with an issuer of the first payment card and configured to interface with an issuer network corresponding to said issuer for retrieving and storing information concerning transaction permissions associated with said first payment card; and
  responsive to the mobile communication device having implemented thereon, application software associated with an issuer of the first payment card and configured to interface with an issuer network corresponding to said issuer for retrieving and storing information concerning transaction permissions associated with said first payment card, querying said application software information for information whether the requested payment transaction based on the first payment card is a permitted transaction.

6. The method as claimed in claim 4, wherein determining that the requested payment transaction is a transaction permitted by the issuer network, comprises:
  determining whether the mobile communication device has implemented thereon, application software associated with an issuer of the first payment card and configured to interface with an issuer network corresponding to said issuer for retrieving and storing information concerning transaction permissions associated with said first payment card; and
  responsive to the mobile communication device not having implemented thereon, application software associated with an issuer of the first payment card and configured to interface with an issuer network corresponding to said issuer for retrieving and storing information concerning transaction permissions associated with said first payment card, querying the issuer network for information whether the requested payment transaction based on the first payment card is a permitted transaction.

7. The method as claimed in claim 1, wherein the wireless access point is configured to have an effective wireless communication range of up to 2 meters from a location of the POS terminal.

8. A system for authentication of an electronic transaction, comprising:
  a processor implemented server configured to:
    send from a mobile communication device to a wireless access point that is in communication with the mobile communication device, information corresponding to a set of payment cards enrolled with a mobile payment wallet implemented on said mobile communication device, wherein the information is sent for each card in the set and is at least one of a card number, a cardholder name, an expiry date, and a Card Verification Code number; sending from a mobile communication device to a wireless access point that is in communication with the mobile communication device, information corresponding to a set of payment cards enrolled with a mobile payment wallet implemented on said mobile communication device, wherein the information is sent for each card in the set and is at least one of a card number, a cardholder name, an expiry date, and a Card Verification Code number;
    receive from a POS terminal, after the mobile communication device sends the information corresponding to the set of payment cards enrolled with the mobile payment wallet to the wireless access point:
      a payment transaction request; and
      information identifying a first payment card for implementing the payment transaction request;
    receive from the wireless access point, the information corresponding to the set of payment cards enrolled with the mobile payment wallet implemented on said mobile communication device, wherein said set of payment cards includes one or more payment cards;

determine whether the received information corresponding to the first payment card matches received information corresponding to any payment card within the set of payment cards enrolled with the mobile payment wallet; and responsive to the received information corresponding to the first payment card matching received information corresponding to a payment card within the set of payment cards enrolled with the mobile payment wallet, implement the requested payment transaction based on the first payment card.

9. The system as claimed in claim 8, wherein the processor implemented server is configured such that responsive to the received information corresponding to the first payment card matching received information corresponding to a payment card within the set of payment cards enrolled with the mobile payment wallet, the requested payment transaction is implemented based on the first payment card without a prior authentication of identity of the individual presenting the first payment card for the requested payment card transaction.

10. The system as claimed in claim 8, wherein the processor implemented server is configured to authenticate identity of the individual presenting the first payment card for the requested payment card transaction in response to the received information corresponding to the first payment card not matching received information corresponding to any payment card within the set of payment cards enrolled with the mobile payment wallet.

11. The system as claimed in claim 8, wherein the processor implemented server is configured to implement the requested payment transaction responsive to determining that the requested payment transaction is a transaction permitted by the issuer network.

12. The system as claimed in claim 11, wherein the processor implemented server is configured such that determining that the requested payment transaction is a transaction permitted by the issuer network, comprises:

determining whether the mobile communication device has implemented thereon, application software associated with an issuer of the first payment card and configured to interface with an issuer network corresponding to said issuer for retrieving and storing information concerning transaction permissions associated with said first payment card; and responsive to the mobile communication device having implemented thereon, application software associated with an issuer of the first payment card and configured to interface with an issuer network corresponding to said issuer for retrieving and storing information concerning transaction permissions associated with said first payment card, querying said application software information for information whether the requested payment transaction based on the first payment card is a permitted transaction.

13. The system as claimed in claim 11, wherein the processor implemented server is configured such that determining that the requested payment transaction is a transaction permitted by the issuer network, comprises:

determining whether the mobile communication device has implemented thereon, application software associated with an issuer of the first payment card and configured to interface with an issuer network corresponding to said issuer for retrieving and storing information concerning transaction permissions associated with said first payment card; and responsive to the mobile communication device not having implemented thereon, application software associated with an issuer of the first payment card and configured to interface with an issuer network corresponding to said issuer for retrieving and storing information concerning transaction permissions associated with said first payment card, querying the issuer network for information whether the requested payment transaction based on the first payment card is a permitted transaction.

14. The system as claimed in claim 1, wherein the wireless access point is configured to have an effective wireless communication range of up to 2 meters from a location of the POS terminal.

15. A computer program product for authentication of an electronic transaction, comprising a non-transitory computer usable medium having computer readable program code embodied therein, the computer readable program code comprising instructions for:

sending from a mobile communication device to a wireless access point that is in communication with the mobile communication device, information corresponding to a set of payment cards enrolled with a mobile payment wallet implemented on said mobile communication device, wherein the information is sent for each card in the set and is at least one of a card number, a cardholder name, an expiry date, and a Card Verification Code number;

receiving from a POS terminal, after the mobile communication device sends the information corresponding to the set of payment cards enrolled with the mobile payment wallet to the wireless access point:

a payment transaction request; and information identifying a first payment card for implementing the payment transaction request;

receiving from the wireless access point, the information corresponding to the set of payment cards enrolled with the mobile payment wallet implemented on said mobile communication device, wherein said set of payment cards includes one or more payment cards;

determining whether the received information corresponding to the first payment card matches received information corresponding to any payment card within the set of payment cards enrolled with the mobile payment wallet; and responsive to the received information corresponding to the first payment card matching received information corresponding to a payment card within the set of payment cards enrolled with the mobile payment wallet, implementing the requested payment transaction based on the first payment card.

* * * * *